US011481879B2

(12) United States Patent
Peana et al.

(10) Patent No.: US 11,481,879 B2
(45) Date of Patent: Oct. 25, 2022

(54) METHOD FOR REDUCING VISUAL FATIGUE AND SYSTEM THEREFOR

(71) Applicant: DELL PRODUCTS, LP, Round Rock, TX (US)

(72) Inventors: Stefan Peana, Austin, TX (US); Yagiz C. Yildiz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 16/453,880

(22) Filed: Jun. 26, 2019

(65) Prior Publication Data
US 2020/0410651 A1 Dec. 31, 2020

(51) Int. Cl.
*G06T 5/00* (2006.01)
*G06T 5/50* (2006.01)
*H04N 5/57* (2006.01)

(52) U.S. Cl.
CPC ............... *G06T 5/009* (2013.01); *G06T 5/50* (2013.01); *G06T 2207/10016* (2013.01); *G09G 2320/103* (2013.01); *G09G 2360/16* (2013.01); *H04N 5/57* (2013.01)

(58) Field of Classification Search
CPC . G06T 5/50; G06T 5/009; G06T 2207/10016; G06T 2207/20208; G06T 7/97; G09G 3/3413; G09G 2320/0646; G09G 2320/0686; G09G 2360/144; G09G 5/10; G09G 2354/00; H04N 5/2351; H04N 5/235; H04N 5/2354; G06K 9/4661
See application file for complete search history.

(56) References Cited

U.S. PATENT DOCUMENTS

| | | | |
|---|---|---|---|
| 9,265,121 B2 | 2/2016 | Lee | |
| 9,934,731 B2 | 4/2018 | Peana | |
| 2006/0239581 A1* | 10/2006 | Neuman | G06T 5/40 382/274 |
| 2017/0039994 A1* | 2/2017 | Wu | G09G 5/10 |
| 2017/0148393 A1 | 5/2017 | Peana | |
| 2017/0161882 A1* | 6/2017 | Mantiuk | A61B 3/024 |
| 2018/0102107 A1 | 4/2018 | Xiong | |
| 2018/0137837 A1 | 5/2018 | Peana et al. | |
| 2018/0338104 A1* | 11/2018 | Pines | G09G 5/00 |
| 2018/0350323 A1* | 12/2018 | Whitehead | G09G 5/026 |

(Continued)

OTHER PUBLICATIONS

"Power-Constrained Contrast Enhancement Algorithm Using Multiscale Retinex for OLED Display," Yeon-Oh Nam et al., IEEE Transactions on Image Processing, vol. 23, No. 8, 07 Transactions on Image Processing, vol. 23, No. Aug. 8, 2014; pp. 3308-3320.

*Primary Examiner* — Xiao M Wu
*Assistant Examiner* — Scott E Sonners
(74) *Attorney, Agent, or Firm* — Larson Newman, LLP

(57) ABSTRACT

A method includes determining a first brightness level of a first video frame and a second brightness level of a second video frame, the second video frame immediately following the first video frame. In response to determining that the second brightness level differs from the first brightness level by at least a predetermined amount, the method includes modifying the brightness of the second video frame and a predetermined number of successive frames to provide successive fractional increments of brightness between the first brightness level and the second brightness level.

14 Claims, 6 Drawing Sheets

(56) References Cited

U.S. PATENT DOCUMENTS

| | | |
|---|---|---|
| 2019/0108816 A1 | 4/2019 | Peana et al. |
| 2020/0036937 A1* | 1/2020 | Zhou ................... H04N 13/383 |
| 2020/0186764 A1* | 6/2020 | Wozniak .................. G06T 5/40 |
| 2020/0202814 A1* | 6/2020 | Chapiro .................. G09G 5/10 |

* cited by examiner

METHOD FOR REDUCING VISUAL FATIGUE AND SYSTEM THEREFOR

FIELD OF THE DISCLOSURE

This disclosure generally relates to information handling systems, and more particularly relates to reducing visual fatigue.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include determining a first brightness level of a first video frame second brightness level of a second video frame, the second video frame immediately following the first video frame. In response to determining that the second brightness differs from the first brightness level by at least a predetermined amount, the method modifying the brightness of the second video frame and a predetermined number of successive frames to provide successive fractional increments of brightness between the brightness level and the second brightness level.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
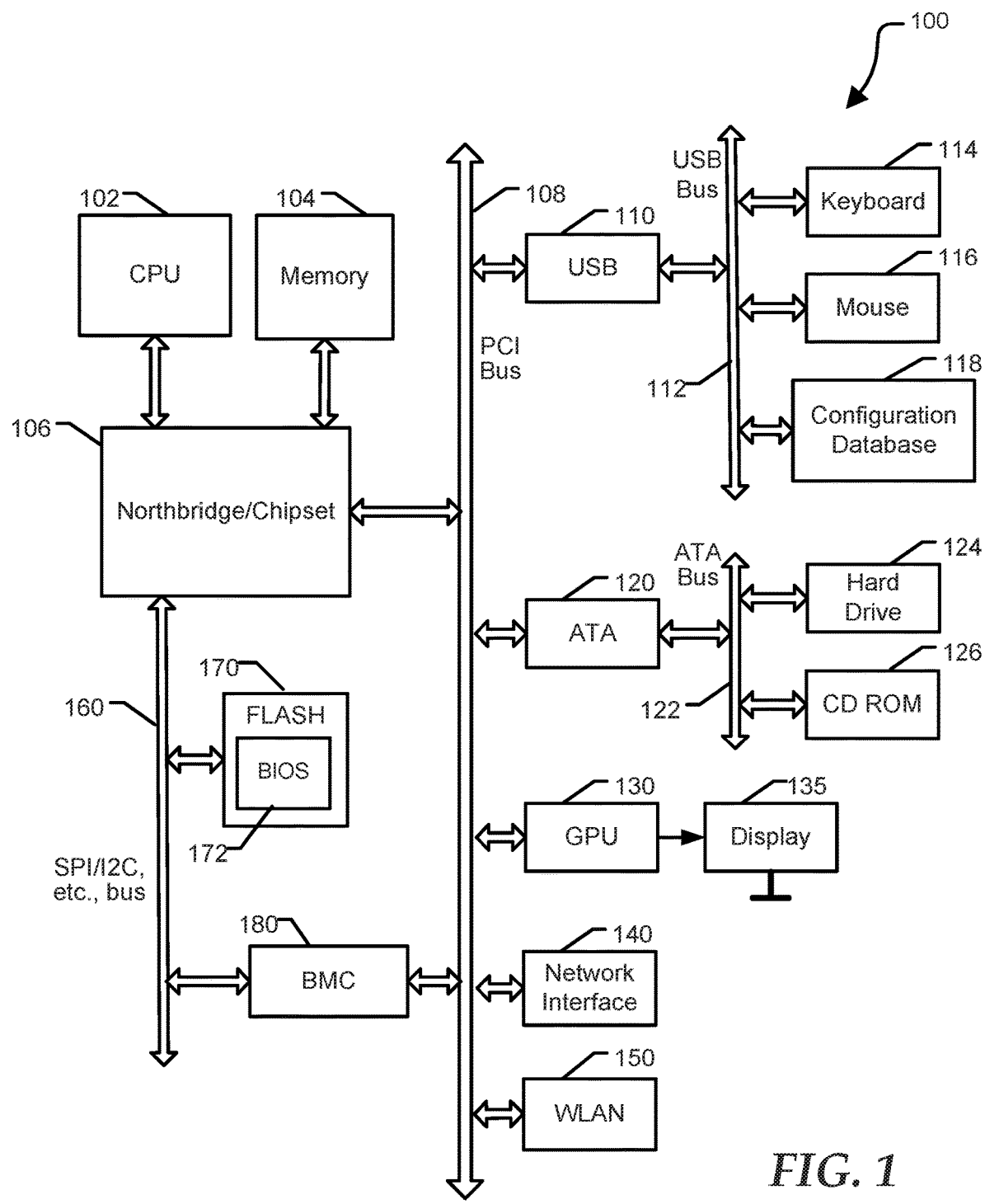
FIG. 1 is a block diagram of an information handling system according to an embodiment of the present disclosure.

FIG. 1 shows an information handling system 100 including a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CDROM) device controller 126, a graphics processing unit (GPU) 130 coupled to a display device 135, a network interface controller (MC) 140, a wireless local area network (WLAN) controller 150, a serial peripheral interface (SPI) bus 160, a first flash memory device 170 for storing BIOS code 172, and a baseboard management controller (BMC) 180.

BMC 190 can be referred to as a service processor, and embedded controller (EC), and the like. The terms BMC and EC are interchangeable with regard to the present disclosure. Flash memory device 170 can be referred to as a SPI flash device, BIOS SPI, and the like. BMC 190 is configured to provide out-of-band and/or side-band access to devices at information handling system 100. As used herein, out-of-band access herein refers to operations performed without support of CPU 102, such as prior to execution of BIOS code 172 by processor 102 to initialize operation of system 100.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard and a mouse.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 172 can be referred to as a firmware image, and the term BIOS is used interchangeably with the term firmware image, or simply firmware. BIOS code 172 includes instructions executable by CPU 102 to initialize and test the hardware system 100, and to load a boot loader or an operating system (OS) from a mass storage device. BIOS code 172 additionally provides an abstraction layer for the hardware, i.e. a consistent way for application programs and operating systems to interact with the display, and other input/output devices. When power is first applied to information system 100, the system begins a sequence of initialization procedures. During the initialization sequence, also referred to as a boot sequence, components of system 100 configured and enabled for operation, and device drivers can be installed. Device provide an interface through which other components of the system 100 can with a corresponding device. In an embodiment, the BIOS code 171 can be substantially compliant with one or more revisions of the UEFI specification. The UEFI standard the antiquated personal computer BIOS system found in some older information systems. However, the term BIOS is often still used to refer to the system firmware. The UEFI specification provides standard interfaces and interoperability guidelines for that together make up an information handling system. In particular, the UEFI provides a standardized architecture and data structures to manage initialization and configuration of devices, booting of platform resources, and passing of control to the operating system.

Information handling system 100 is configured to execute software application programs. A user of system 100 may typically run a large number of application programs provided by disparate suppliers, each program having its own image characteristics, such as brightness, color, contrast, and the like. For example, one application may utilize white text on a black or dark-colored background, while another application may include black text on a white or light-colored background. Similarly, large variations in display brightness can be experienced while using an Internet browser. A user that is confronted with wide variations in screen brightness can experience visual fatigue including discomfort and diminished visual performance. FIGS. 2-7 illustrate techniques for reducing visual fatigue that may be experienced while viewing an information handling system display.

The human eye contains two types of photoreceptors, rods and cones. Rods are generally associated with brightness and are maximally sensitive to wavelengths near 500 nm. Cones are associated with color perception, and typically include three types of cones, each with different sensitivity for different light wavelengths. Furthermore, the human eye's perception of color also depends on brightness. When eyes are exposed to wide variations of light the eye, internal visual pigments are react to protect the eye and to adapt to the light changes. This phenomenon is known as visual adaptation and it covers two components; light adaptation when the eyes adjust to various levels of light intensity, and chromatic adaptation when the eyes adjust to changes in illumination to preserve the appearance of object colors. Visual adaptation can take several minutes to adjust to a change in brightness, depending on the intensity contrast of the light transition, ambient lightning in surrounding area, and the like. Techniques disclosed herein can minimize visual fatigue caused be sudden brightness variation by processing video images prior to displaying the images at display device 135.

As used herein, the term brightness is used to represent a subjective attribute of visual perception in which an observer is able to distinguish differences in luminance, while the term luminance is typically used to refer to a photometric measure of a luminous intensity per unit area of light. The international system unit for luminance is candela per square meter (cd/m2), also referred to as a nit. Accordingly, brightness is the term for the subjective impression of the objective luminance measurement standard. In particular, a measurement of brightness, as used herein, can be determined based on any attribute such as intensity, luminosity, lightness, color, environmental lighting, and the like, that contributes to the subjective perception of brightness. The sensitivity of rods and cones of the human eye vary considerably based on wavelength of the observed light. Accordingly, lights of equal power but different wavelengths do not all appear equally bright.

Figure 2:
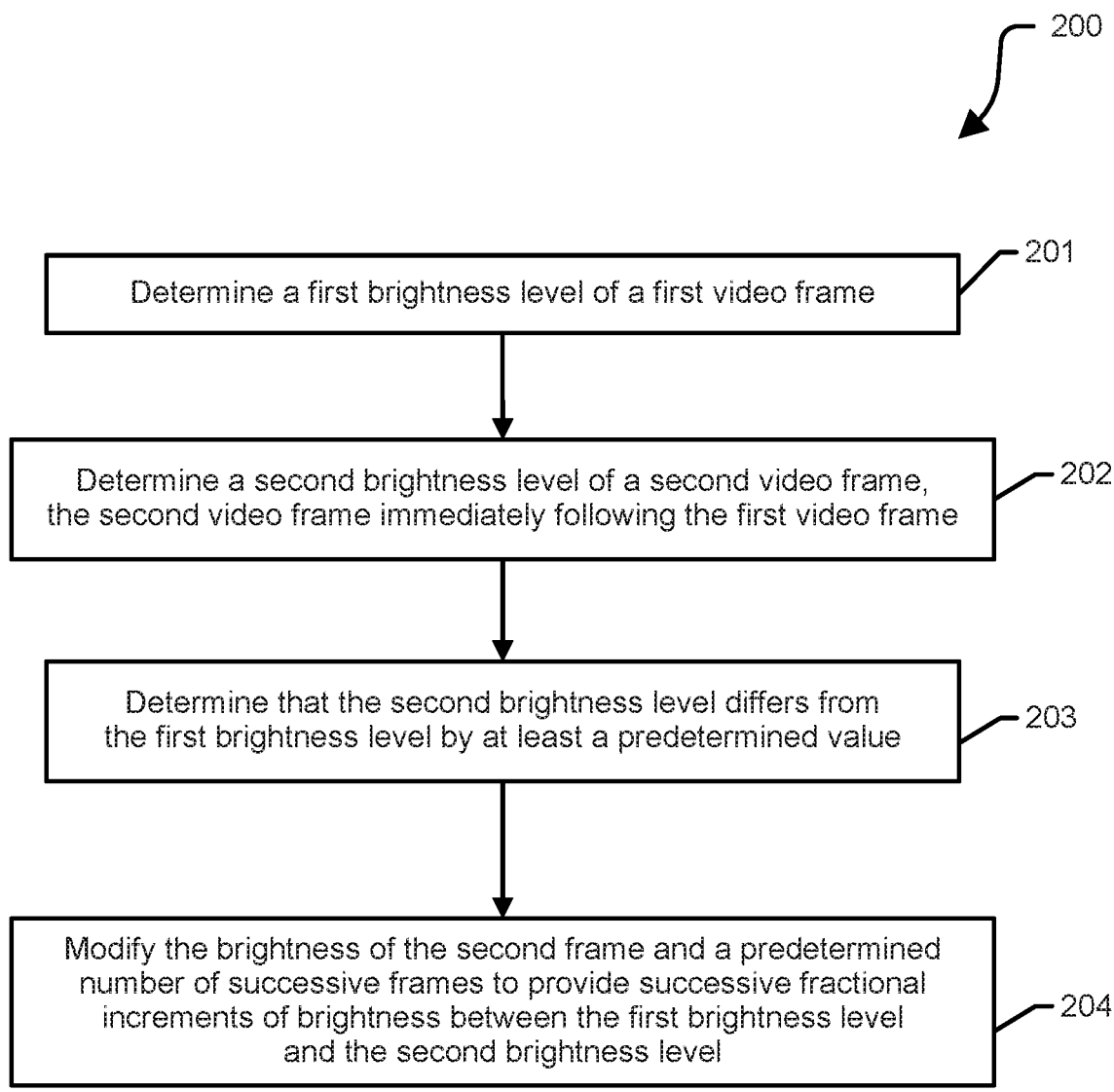
FIG. 2 is a flow diagram illustrating a method for processing a sequence of video frames to reduce visual fatigue that can result from sudden variations in brightness, according to a specific embodiment of the present disclosure.

FIG. 2 shows a method 200 for processing a sequence of video frames to reduce fatigue that can result from sudden variations in brightness, according to a specific embodiment of the present disclosure. Method 200 begins at block 201 where a level of a first video frame is determined. For example, histogram analysis of a video portions of a video frame, or one or more selected raster lines that make up the video can be used to determine a brightness of a video frame. In an embodiment, the video frame can be determined, fully or in part, based on a source of the video image displayed, such as an identify of a software application program or web page that the image. Method 200 continues at block 202 where a brightness level of a second frame is determined, the second video frame immediately following the first video block 203, it is determined that the brightness level of the second video frame differs brightness level of the first video frame by at least a predetermined amount. For second video frame may be considerably brighter, or less bright, than the first video the difference in brightness is greater than a predetermined value, a viewer may visual discomfort and/or reduced visual clarity.

Method 200 concludes at block 204 where the brightness of the second frame and a predetermined number of successive frames is modified to provide successive fractional increments of brightness between the first brightness level and the second brightness level. For example, if the second video frame is significantly brighter than the first video frame, the brightness of a number of video frames subsequent to the first video frame can be processed to provide a sequence of transitional brightness levels, increasing incrementally to the second brightness level. Similarly, if the second video frame is significantly less bright than the first video frame, the brightness of a number of video frames subsequent to the first video frame can be processed to provide a sequence of transitional brightness levels, decreasing incrementally to the second brightness level.

The number of incremental-brightness transition steps, the brightness of each transition step, and the duration of each transition step can be determined based on the analysis of brightness contrast between the first frame and the second frame, the frames following the second frame, and real-time evaluation of other parameters that contribute to perceived brightness. The number, duration, and size of each transition be further determined based other parameters, including the intensity and color ambient illumination in a viewers environment, a distance between the viewer and the display brightness, and the like. The number of transition steps and the duration of each transition step can be selected to minimize visual fatigue experienced by the viewer, to minimize perceived flicker, and to optimize readability and clarity. The brightness characteristics can be further determined based on the principles of light adaptation and chromatic adaptation properties of human vision. Accordingly, the total time to perform incremental brightness transitions can be seconds, tens of second, hundreds of seconds, more. In an embodiment, the transition parameters may be reevaluated and modified on brightness of one or more video frames following the second frame. Furthermore, perception of color by the human eye is influenced by brightness. Accordingly, color properties of each of the transitional frames can be adjusted so that the viewer does not perceive a change in the image color as the brightness is adjusted.

Figure 3:
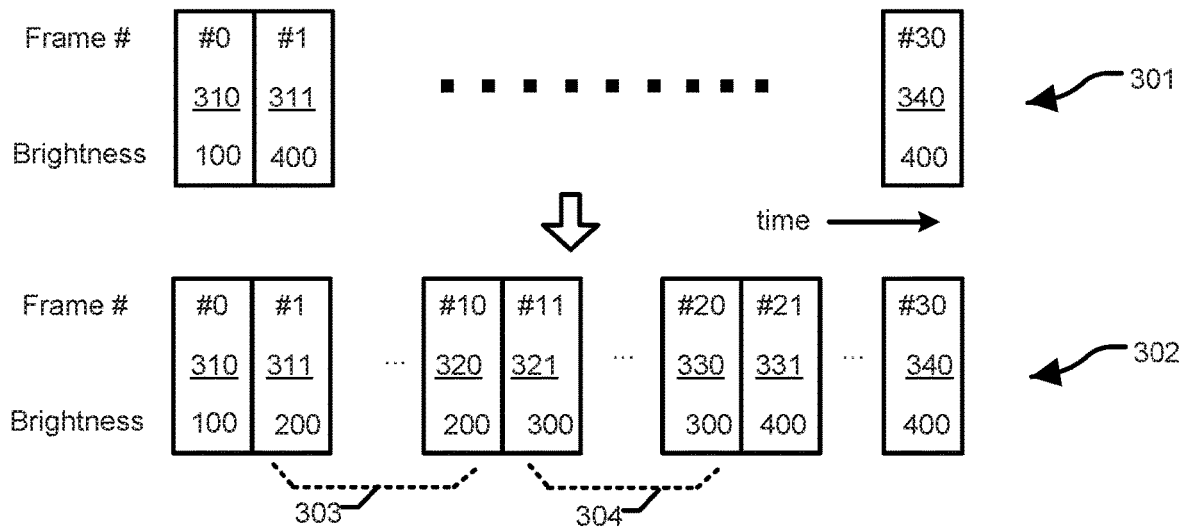
FIG. 3 is a block diagram illustrating the processing of video frames to reduce visual fatigue according to a specific embodiment of the present disclosure.

FIG. 3 shows processing of video frames to reduce visual fatigue according to a specific embodiment of the present disclosure. FIG. 3 includes an original sequence of video frames 301 as received from a video source, and a sequence of video frames processed according to method 200 described above. Original sequence 301 includes video frames numbered zero to thirty, including a first video frame, 310, a second video frame 311, and a thirtieth video frame 340. Video frame 310 has a luminance level of 100 nits and video frame 311 has a luminance level of 400 nits. In response to determining that the transition from 100 nits to 400 nits exceeds a predetermined threshold value, image processing software can modify the brightness of the second frame and a number of subsequent frames to provide frames having transitional brightness. In the present example, the brightness of frames 311 to 320 are adjusted from the original value of 400 nits to a value of 200 nits (transition interval 303), and the brightness of frames 321 to 330 are adjusted from the original value of 400 nits to a value of 300 nits (transition interval 304). While two intermediate transition brightness levels are illustrated, each including ten frames, one of skill will appreciate that a greater number of incremental brightness transitions (or only a single intermediate transitional step) can be provided, and that each transition can include fewer frames or a greater number of frames.

Figure 4:
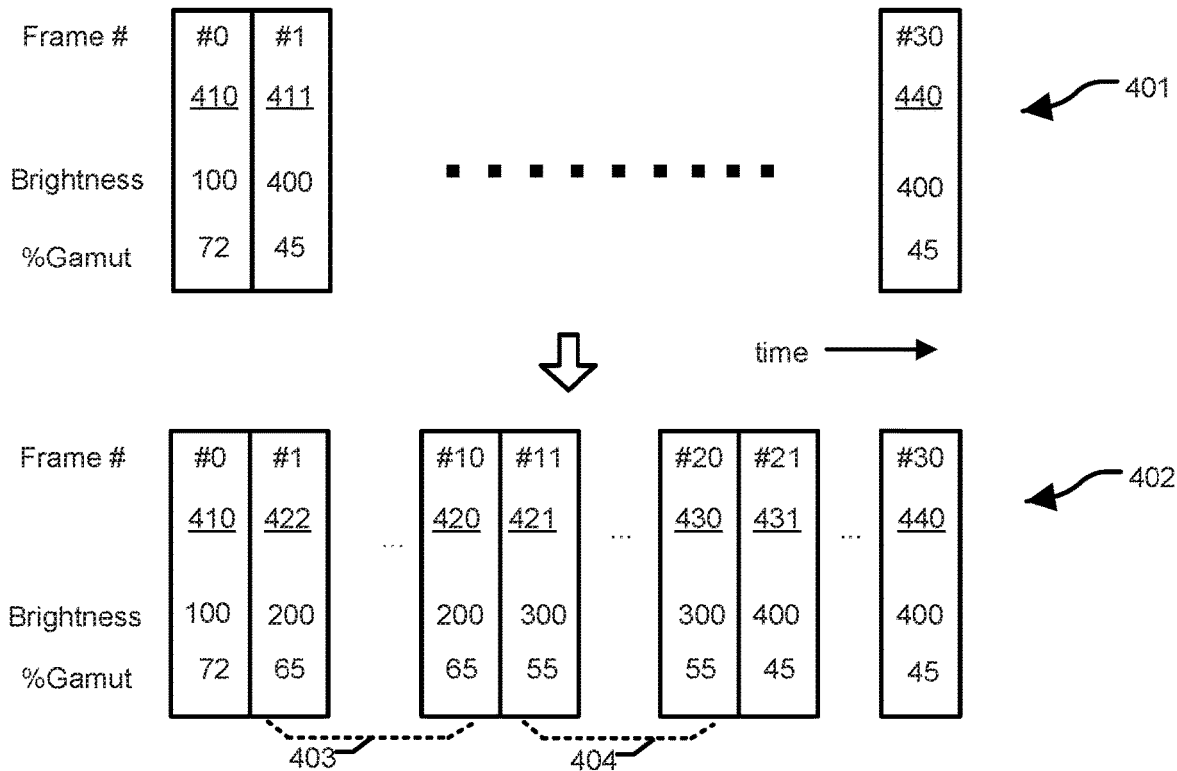
FIG. 4 is a block diagram illustrating the processing of video frames to reduce visual fatigue according to another embodiment of the present disclosure.

FIG. 4 shows processing of video frames to reduce visual fatigue according to embodiment of the present disclosure. FIG. 4 includes an original sequence of video 401 as received from a video source, and a sequence of video frames processed method 200 described above. Original sequence 401 includes video frames numbered thirty, including a first video frame, 410, a second video frame 411, and a thirtieth video frame 440. Video frame 410 has a brightness level of 100 nits and video frame 411 has a brightness level of 400 nits. In response to determining that the transition from 100 nits 400 nits exceeds a predetermined threshold value, image processing software can brightness of the second frame and a number of subsequent frames to provide frames transitional brightness. In the present example, the brightness of frames 411 to 420 are adjusted from the original value of 400 nits to a value of 200 nits (transition interval the brightness of frames 421 to 430 are adjusted from the original value of 400 nits to a of 300 nits (transition interval 404). In addition to adjusting the brightness of the frames, FIG. 4 illustrates adjusting the color of the transitional frames so that the viewer not perceive a change in the color of the intermediate frames.

Figure 5:
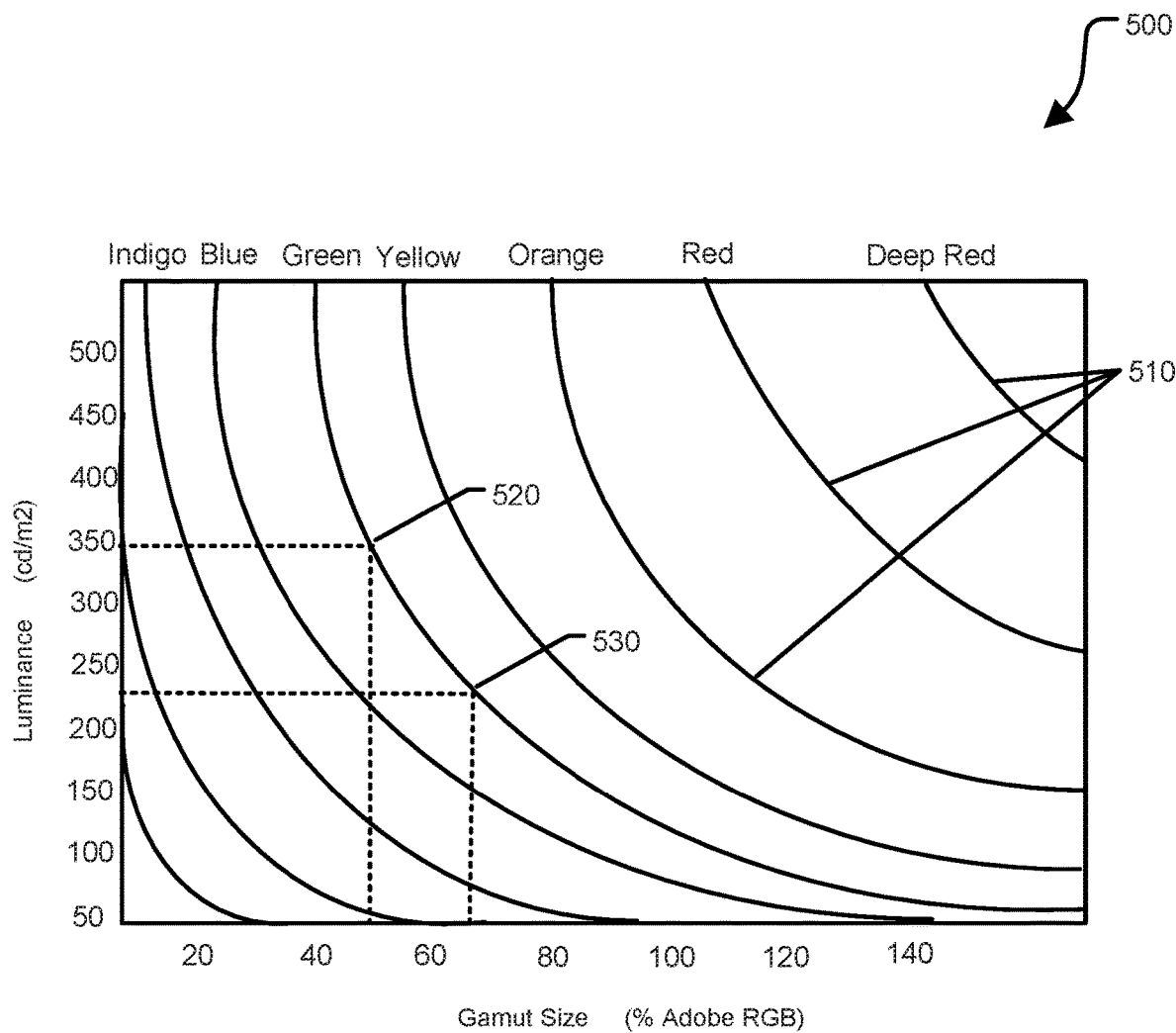
FIG. 5 is a graph illustrating color as a function of luminance and gamut size according to a specific embodiment of the present disclosure.

As described above, color perception depends on the luminosity of the viewed One way of expressing this relationship is shown at FIG. 5. FIG. 5 shows a graph 500 illustrating color as a function of luminosity (vertical dimension) and gamut size dimension). Graph 500 includes a selection of colors 510 ranging from deep red, to red, orange, yellow, green, blue, and indigo. In particular, graph 500 illustrates how a color hue can be reproduced over a range of luminance levels as a function of gamut size. example, a particular green hue can be provided at either reference point 520 350 nits and 50% of the Adobe RGB color gamut, or at reference point 530 a luminance of 230 nits and 64% of the Adobe RGB color gamut. Accordingly, as the luminance of the display decreases, a greater % gamut is necessary to display the same perceived color. The illustrated values are merely for example and will vary based on characteristics of the display device. In color reproduction, the term color gamut refers subset of colors that can be accurately represented in a given circumstance, such as with given color space for by a certain output device. A color display device can not presently display all of the colors that the human eye can differentiate. Accordingly, a display can be specified to accurately generate a predefined subset of colors. For example, the RGB color space is an RGB color space developed by Adobe Systems, Inc. The Adobe color space includes a subset of the range of visible colors, and a display device can be be 100% Adobe RGB compliant if the device can display every color included in the RGB color space. Typical display devices today fall short of achieving 100% compliance. Another color space, known as the standard RGB (sRGB) color space includes a smaller subset of the visible color space, and display devices today may achieve 100%

Returning to FIG. 4, colors at frames included in transition intervals 403 and 404 can be adjusted corresponding to the adjusted luminance so the human eye does not see a shift in hue. For example, a color at frame 410 of the original video stream, having a brightness of 100 nits, may require 72% of the Adobe gamut, while a color at frame 411, having a brightness of 400 nits, can only be provided at 45% of the Adobe gamut. Accordingly, at the percentage gamut of the frames included in transition interval 403 can be adjusted from a value of 65% corresponding to a brightness of 200 nits, and the percentage gamut of the frames included in transition interval 404 can be adjusted from a value of 55% corresponding to a brightness of 300 nits. One of skill will appreciate that expressing color as a function of gamut coverage is only one way of expressing the incremental transition of color concurrent with the incremental transition of frame brightness. In practice, an image processor can utilize lookup tables to determine desired color adjustment values corresponding to desired luminance values.

Figure 6:
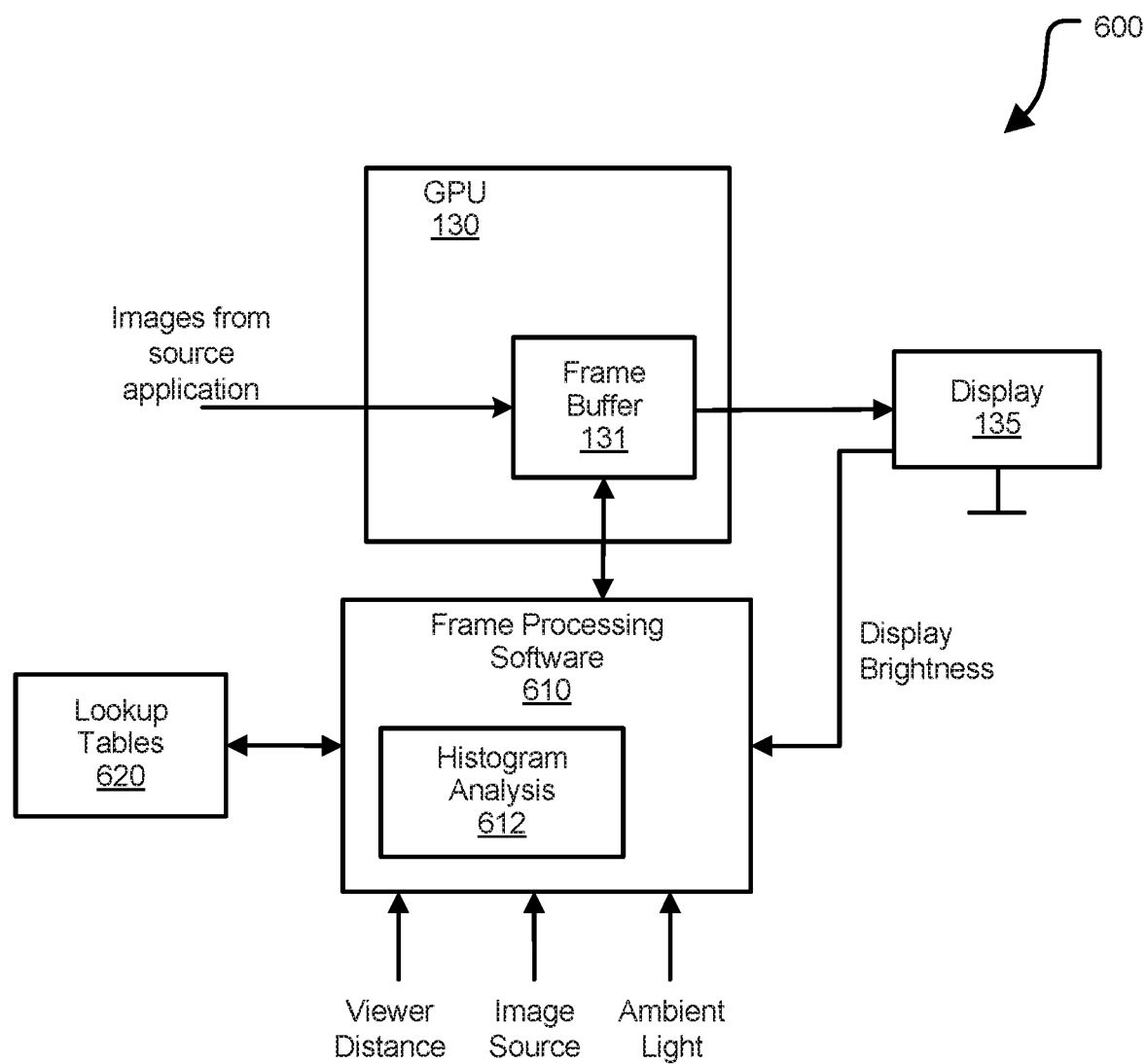
FIG. 6 is a block diagram illustrating how image processing software can generate transitional frames according to a specific embodiment of the present disclosure.

FIG. 6 shows how image processing software can generate transitional frames according to a specific embodiment of the present disclosure. FIG. 6 includes a portion of information handling system 100, including GPU 130, display device 135, frame processing software 610, and lookup tables 620. GPU 130 includes a frame buffer 131 frame processing software 610 includes a histogram analysis module 612. GPU 130 is configured to process video information provided by a source application for display device 130. Frame buffer 130 includes random access memory and circuitry to one or more frames of video data, a video frame sometimes referred to as a bitmap, that continuously being sent to display device 135. The bitmap includes color values for each to be shown on display device 135. Frame processing software 610 is configured to process the image data included at frame buffer 131 as described above with reference FIGS. 2-5. In particular, frame processing software 610 is configured to determine when if to modify the brightness and/or color of a sequence of frames based on an analysis of brightness and other parameters. Histogram analysis module 612 is configured to brightness of adjacent video frames, and in particular, to identify when the brightness of frame differs from that of a preceding frame by a configurable amount.

During operation, frame processing software 610 can utilize the information provided by histogram analysis module 612 to determine if transitional brightness steps should be generated, how many incremental transition steps to provide, a duration of each transition step, and the like. The determination of whether to introduce transitional frames can be further based on, or alternatively based on how far a viewer is positioned away from display device 135, a source of the image provided to frame buffer 131, an intensity and color of ambient light in the viewers environment, configuration of a brightness control at display device 135, and the like. The viewer distance information can be determined using a camera or proximity detection circuitry included at display device 135. Ambient light intensity and color temperature information can be provided by a light sensor included at information handling system 100, for example at display device 135. The Image source information can identify the particular software application that is generating each video frame. In an embodiment, lookup tables 620 can includes information associating specific software applications with a brightness level. For example, one application may display white text on a dark background, while another program is known to utilize a light colored background. Frame processing software 610 can determine that the source of video frames processed at frame buffer 131 has changed, and that the change would result in a significant change in brightness. Accordingly, frame processing software 610 can adjust the brightness of a number of subsequent frames to provide frames having transitional-brightness levels based on the image source information, with or without information provided by histogram analysis module 612. Dynamic variations in frame brightness may be encountered more frequently in the future because there is a trend towards using a dark background to reduce power consumption of newer display technologies, such as displays utilizing organic light emitting diodes and micro light emitting diodes.

In an embodiment, lookup tables 620 can define criteria for determining that a sequence of frames may cause visual fatigue. For example, a dark ambient environment may cause a particular change in frame brightness to be more visually stressful than it would be with brighter ambient lighting. Similarly, a particular change in frame brightness may be less visually stressful if the viewer is farther from display device 135. In an embodiment, lookup tables 620 can indicate the timing of transitional frames based on parameters that impact visual perception of brightness. In the event that frame processing software 610 determines that transitional frames should be generated, the processing of frame luminance can be expedited using information included at lookup tables 620. The frame processing may include translation of image data between different chromaticity color spaces, representations, and the like.

Figure 7:
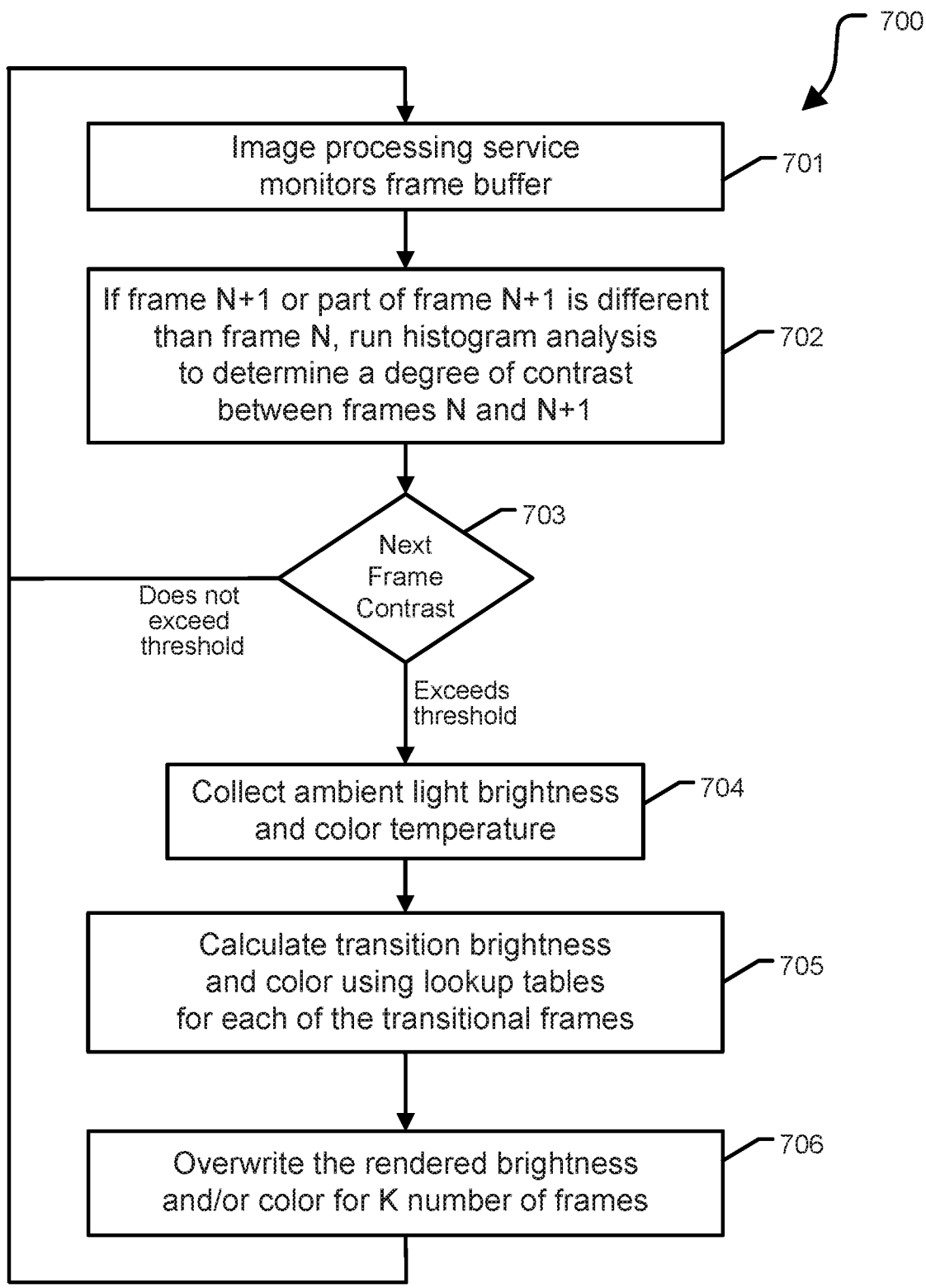
FIG. 7 is a flow diagram illustrating a method for processing a sequence of video frames to reduce visual fatigue, according to another embodiment of the present disclosure.

FIG. 7 shows a method 700 for processing a sequence of video frames to reduce visual fatigue according to another embodiment of the present disclosure. Method 700 begins at block 701 where a software and/or hardware image processing service monitors video images included at a frame buffer at a graphics processing unit. For example, frame processing software 610 can evaluate how bright each frame of a sequence of video frames will be perceived by a viewer during operation of display device 135. The perceived brightness can be based on luminance information associated with each frame, and further based on other parameters that can influence the perception of brightness, as described above. At block 702, histogram analysis to determine a degree of contrast between frames N and N+1 is performed if it is determined that frame N+1 or part of frame N+1 is different than frame N. At decision block 703, if the contrast between frames N and N+1 exceeds a predetermined threshold, method 700 proceeds to block 704 where the brightness and color temperature of ambient light in the viewer's environment is evaluated. The evaluation of whether the contrast exceeds the threshold can be based on all pixels of each frame, or a portion of pixels of each frame.

If the contrast between frames N and N+1 does not exceed the predetermined threshold, method 700 returns to block 701 where monitoring of images at the frame continues. At block 705, brightness level and color of transitional frames is calculated, example based on lookup tables 620. Method 700 completes at block 706 where the brightness and/or color of a number of frames following frame N are overwritten to incremental transitional steps of brightness over the sequence of subsequent frames. number of transitional steps, the number of frames included in each step, and the and color of frames included at each step, can be determined so as to minimize visual and improve clarity. In an embodiment, the transitional brightness steps can be linear nonlinear, taking into account that the perception of brightness and color by the human not linear relative to luminance.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so device connected to a network can communicate voice, video or data over the network. Further, the instructions may be transmitted or received over the network via the interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   determining a first brightness level associated with a first video frame;
   determining a second brightness level associated with a second video frame, the second video frame immediately following the first video frame;
   identifying a software application generating the first video frame and the second video frame;
   determining a viewer distance;
   in response to determining that the second brightness level differs from the first brightness level by at least a predetermined amount:
      identifying a transition time by querying a table that associates the software application and the viewer distance to the transition time;
      determining a number of transition steps within the transition time;
      determining, for each transition step, a transition duration;
      successively modifying, within each transition step and for the associated transition duration, the brightness of the second video frame and a predetermined number of successive frames from the first brightness level to the second brightness level; and
      minimizing a shift in hue by modifying, within each transition step and for the associated transition duration, a color associated with the second video frame and the predetermined number of successive frames.

2. The method of claim 1, wherein the first brightness level and the second brightness level are determined based on an average brightness of a raster line of the first video frame and an average brightness of a corresponding raster line of the second video frame.

3. The method of claim 1, wherein the first brightness level and the second brightness level are determined based on identifying a first image source associated with the first video frame and based on identifying a second image source associated with the second video frame.

4. The method of claim 1, wherein the determining is in response to receiving an indication of a transition from display of a first page at an Internet browser and display of a second page at the Internet browser.

5. The method of claim 1, wherein each of the predetermined number of successive frames is further modified to provide an adjustment of color information.

6. The method of claim 1, wherein each of the predetermined number of successive frames is further modified to provide an adjustment of luminosity.

7. The method of claim 1, wherein each of the predetermined number of successive frames is further modified to provide an adjustment of gamut size.

8. The method of claim 1, wherein a number of transitions of different fractional increments of the brightness is configurable.

9. The method of claim 1, determining fractional increments of the brightness.

10. An information handling system comprising:
a graphics processing unit including a frame buffer; and
a central processing unit to:
determine a first brightness level of a first video frame at the frame buffer;
determine a second brightness level of a second video frame, the second video frame immediately following the first video frame;
identify a software application generating the first video frame and the second video frame;
determine a viewer distance;
in response to determining that the second brightness level differs from the first brightness level by at least a predetermined amount:
identify a transition time by querying a table that associates the software application and the viewer distance to the transition time;
determine a number of transition steps within the transition time;
determine, for each transition step, a transition duration;
successively modify, within each transition step and for the associated transition duration, the brightness of the second video frame and a predetermined number of successive frames from the first brightness level to the second brightness level; and
minimize a shift in hue by modifying, within each transition step and for the associated transition duration, a color associated with the second video frame and the predetermined number of successive frames.

11. The information handling system of claim 10, wherein the first brightness level and the second brightness level are determined based on identifying a first image source associated with the first video frame and based on identifying a second image source associated with the second video frame.

12. The information handling system of claim 10, wherein each of the predetermined number of successive frames is further modified to provide an adjustment of color information.

13. The information handling system of claim 10, wherein each of the predetermined number of successive frames is further modified to provide an adjustment of luminosity.

14. The information handling system of claim 10, wherein a number of transitions of different fractional increments of brightness is configurable.

* * * * *